(12) United States Patent
Kohli (10) Patent No.: US 10,559,031 B2
(45) Date of Patent: Feb. 11, 2020

(54) SYSTEMS AND METHODS FOR ANALYZING SPENDING BEHAVIOR OF PARTICIPANTS ASSOCIATED WITH FUND DISBURSEMENT PROGRAMS

(71) Applicant: MASTERCARD INTERNATIONAL INCORPORATED, Purchase, NY (US)

(72) Inventor: Manoneet Kohli, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 738 days.

(21) Appl. No.: 15/155,286

(22) Filed: May 16, 2016

(65) Prior Publication Data

US 2017/0330276 A1 Nov. 16, 2017

(51) Int. Cl.
*G06Q 40/00* (2012.01)
*G06Q 40/02* (2012.01)
*G06Q 30/06* (2012.01)

(52) U.S. Cl.
CPC ............. *G06Q 40/02* (2013.01); *G06Q 30/06* (2013.01); *G06Q 40/00* (2013.01)

(58) Field of Classification Search
CPC ............................... G06Q 40/00; G06Q 40/02
See application file for complete search history.

(56) References Cited

U.S. PATENT DOCUMENTS 7,693,759 B2 * 4/2010 Alberti .................. G06Q 40/02 705/30
8,296,205 B2 * 10/2012 Zoldi ..................... G06Q 40/00 705/35
2005/0283397 A1 * 12/2005 Rimsky ............ G06Q 10/06375 705/7.34
2007/0061260 A1 * 3/2007 deGroeve .............. G06Q 20/10 705/44
2010/0057622 A1 * 3/2010 Faith ..................... G06Q 40/00 705/38

OTHER PUBLICATIONS

Gerry Blackwell, Preparing for the e-billing revolution, Jul. 2007, Bereskin & Parr, web, 1-2 (Year: 2007).*

* cited by examiner

*Primary Examiner* — I Jung Liu
(74) *Attorney, Agent, or Firm* — Harness, Dickey & Pierce, P.L.C.

(57) ABSTRACT

Systems and methods are provided for use in responding to purchase behaviors of participants of disbursement programs. One exemplary method includes accessing transaction data associated with a payment account, where the payment account is associated with a participant and a disbursement program and where the transaction data is representative of a number of transactions made to the payment account. The method also includes identifying, for each of the transactions, a classification based on at least one classification criteria and calculating a behavior score based on at least one behavior parameter and the classification of at least one of the transactions. And, when the behavior score satisfies a remedial threshold, causing a remedial response to be provided to the participant, whereby the remedial response indicates to the participant to alter one or more purchase behaviors.

16 Claims, 3 Drawing Sheets

SYSTEMS AND METHODS FOR ANALYZING SPENDING BEHAVIOR OF PARTICIPANTS ASSOCIATED WITH FUND DISBURSEMENT PROGRAMS

FIELD

The present disclosure generally relates to systems and methods for use with fund disbursement programs, in which purchase behaviors of participants to the programs are analyzed in order to provide certain responses to the participants regarding the purchase behaviors, for example, to incentivize certain behaviors and discourage others.

BACKGROUND

This section provides background information related to the present disclosure which is not necessarily prior art.

Many government agencies, charities, or other groups, organizations, etc. provide disbursement programs for the welfare of certain types and/or classes of people. The programs are known to target impoverished people to, not only, provide for their survival, but also enable the people to improve their situations and/or livelihoods. Many known programs make use of payment accounts linked to credit/debit cards, or other payment devices, whereby disbursements are provisioned to the payment accounts, rather than being provided in other known forms such as, for example, checks, etc. The payment accounts are then used, by the participants, in traditional fashion to purchase products, especially products permitted by the disbursement programs.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Fund disbursement programs, by governmental agencies or other organizations, groups, etc., make use of payment accounts for providing funds to participants. In turn, the participants use the payment accounts to purchase products (e.g., good and services, etc.), including necessities such as, for example, food, shelter, clothing, etc., and potentially other products such as, for example, luxuries, etc. As purchases are funded by the payment accounts, transaction data representing the purchase transactions is generated and stored. Uniquely, the systems and methods herein access transaction data associated with particular payment accounts enrolled in disbursement programs, and determine whether to communicate one or more responses to participants associated with the payment accounts based on purchasing behavior of the participants being appropriate or inappropriate. In particular, the purchase behavior of the participants is scored based on the accessed transaction data, in combination with various classification criteria and/or behavior parameters set by fund provider agencies for the disbursement programs. When the scores satisfy, or fail to satisfy, certain thresholds, responses may be provided to the participants, for example, reward responses or remedial responses. In this manner, good purchase behavior by participants, as classified by the fund provider agencies, may be incentivized while poor purchase behavior may be discouraged.

Figure 1:
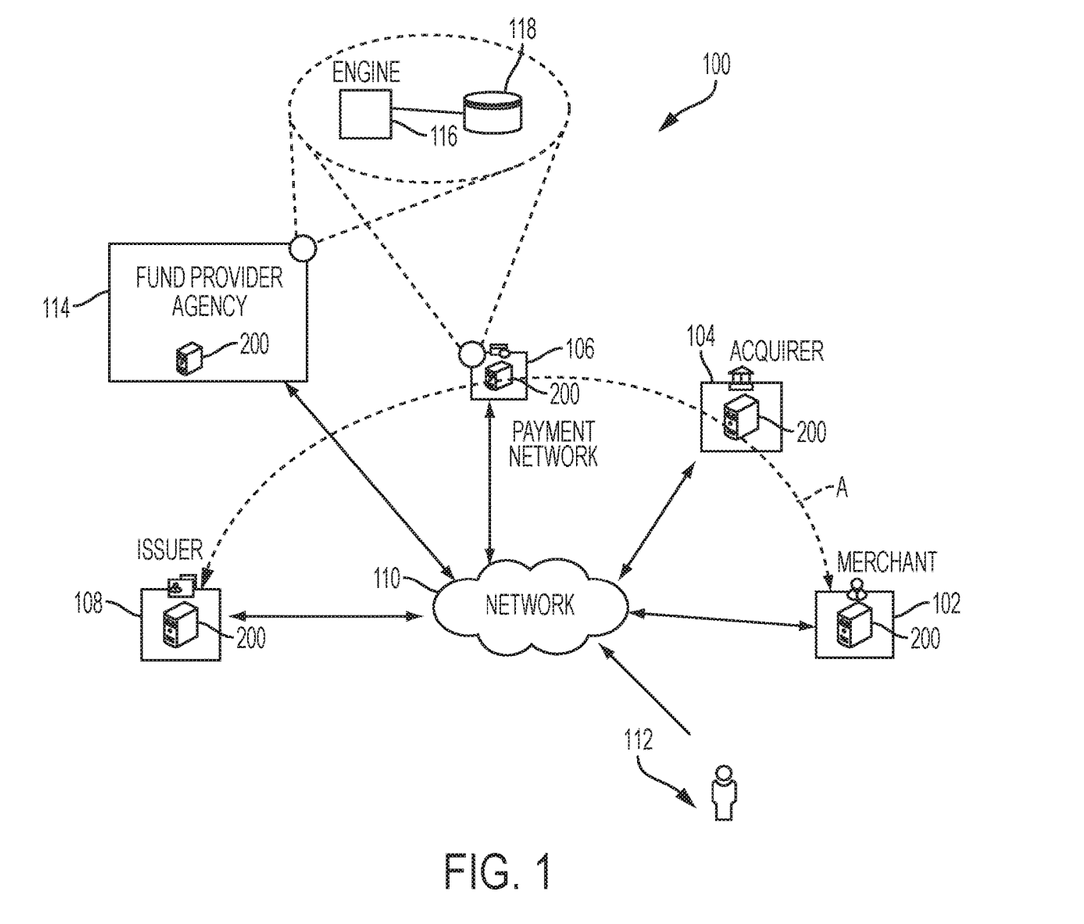
FIG. 1 is a block diagram of an exemplary system of the present disclosure suitable for use in identifying purchase behaviors for participants associated with disbursement programs, and providing appropriate responses to the participants based on the purchase behaviors.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, arrangements of, disbursement programs within payment networks, relationships of disbursement programs with issuers and/or merchants, etc.

As shown in FIG. 1, the system 100 generally includes a merchant 102, an acquirer 104, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between the merchant 102, the payment network 106, and other parts of the system 100.

The merchant 102 is generally associated with products (e.g., goods and/or services, etc.), which are offered for sale and are sold to consumers in the system 100, including consumer 112. The merchant 102 may offer the products for sale in physical and/or virtual locations (e.g., brick-and-mortar locations, website locations, web-based store front locations, etc.), as desired. Further, the consumer 112 is able to fund transactions with the merchant 102 for one or more of the products, via a payment account.

In addition in the system 100, the consumer 112 is a disbursement program participant, and the consumer's payment account is also associated with a disbursement program. As such, the consumer's payment account is an enrolled payment account. And, in connection therewith, the consumer 112 can use the payment account to purchase products consistent with the program's intent (e.g., food, clothing, shelter, learning materials, job training, education expenses, etc.), or inconsistent with the program's intent. The consumer 112 is understood herein to be a participant in the disbursement program. This will be described in more detail hereinafter.

In one example use of the consumer's payment account, the consumer 112 initiates a purchase transaction with the merchant 102, for the purchase of a product, by presenting a payment device associated with the enrolled payment account to the merchant 102 (e.g., a credit card, a debit card, a fob, a smartcard, a web-based e-wallet application, etc.). In turn, the merchant 102 submits an authorization request to the acquirer 104 (associated with the merchant 102) for the transaction, to determine whether the payment account is in good standing and whether there is sufficient funds and/or credit to cover the transaction. The authorization request is transmitted along path A in the system 100. The acquirer 104 communicates the authorization request with the issuer 108 (associated with the consumer's payment account), through the payment network 106, such as, for example, through MasterCard®, VISA®, Discover®, American Express®, etc. In turn, if approved, an authorization reply or response (indicating the approval of the transaction) is transmitted back from the issuer 108 to the merchant 102, along path A, thereby permitting the merchant 102 to complete the transaction. The transaction is later cleared and/or settled (via appropriate transaction messages such as clearing messages and/or settlement messages) by and between the merchant 102, the acquirer 104, and the issuer 108 (by appropriate agreements). If declined, however, the authorization reply (indicating a decline of the transaction) is provided back to the merchant 102, along path A, thereby permitting the merchant 102 to halt or terminate the transaction, or request an alternate form of payment.

Transaction data is generated, collected, and stored as part of the above interactions among the merchant 102, the acquirer 104, the payment network 106, and the issuer 108 (and included in the various transaction messages). The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). Additionally, or alternatively, the merchant 102, the acquirer 104 and/or the issuer 108 may store the transaction data, or part thereof, in a data structure, or transaction data may be transmitted between parts of system 100 as used or needed. The transaction data may include, for example, payment account numbers (PANs) for consumers involved in the transactions, amounts of the transactions, merchant IDs for merchants involved in the transactions, classifications and/or categories of products/merchants (e.g., merchant category codes (MCCs)), dates/times of the transactions, products purchased and related descriptions or identifiers, etc. It should be appreciated that more or less information related to transactions, as part of either authorization or clearing and/or settlement, may be included in transaction records and stored within the system 100, at the merchant 102, the acquirer 104, the payment network 106 and/or the issuer 108.

In various exemplary embodiments, the participants (e.g., consumer 112, etc.) involved in the different transactions herein are prompted to agree to legal terms associated with their payment accounts (or with the fund disbursement programs with which they are associated), for example, during enrollment for the payment account, etc. In so doing, the participant may voluntarily agree, for example, to allow merchants, issuers, payment networks, fund providing agencies associated with the disbursement programs, etc., to use data collected during enrollment and/or collected in connection with processing the transactions consistent with one or more of the different operations described herein.

Further, while one acquirer 104, one payment network 106, and one issuer 108 are illustrated in FIG. 1, it should be appreciated that any number of these entities (and their associated components) may be included in the system 100, or may be included as a part of systems in other embodiments, consistent with the present disclosure. Likewise, it should be appreciated that, while only one merchant 102 and one consumer 112 are illustrated for ease of reference, multiple merchants and/or consumers may be added in the system 100.

Figure 2:
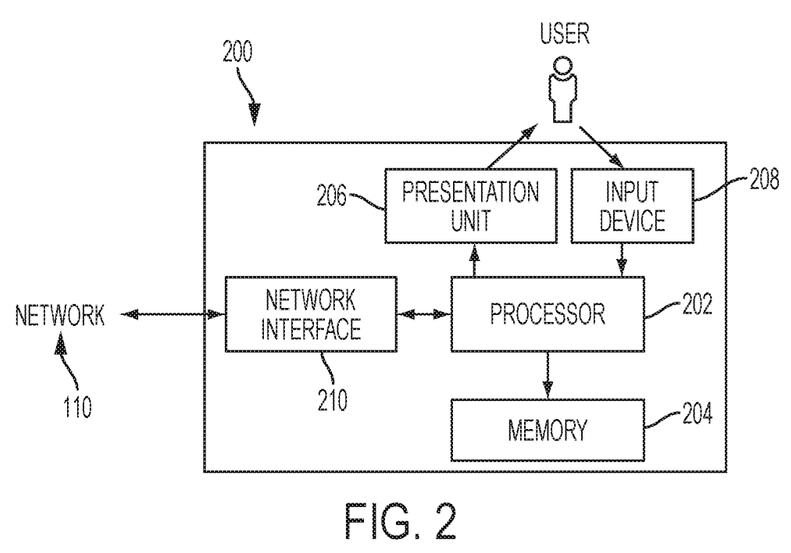
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are configured to function as described herein.

In the exemplary embodiment of FIG. 1, each of the merchant 102, the acquirer 104, the payment network 106, and the issuer 108 are illustrated as including, or being implemented in, computing device 200, coupled to the network 110. In addition, a fund provider agency 114 of the system 100 (which will be described more hereinafter) includes a computing device 200. However, the system 100 should not be considered to be limited to the computing device 200, as described below, as different computing devices and/or arrangements of computing devices may be used.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic circuit (PLC), a gate array, and/or any other circuit or processor capable of the operations described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, payment account information, participant/consumer profiles, participant work details, expense classification criteria, behavior parameters, categories, threshold parameters, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein.

In the exemplary embodiment, the computing device 200 also includes a presentation unit 206 that is coupled to (and in communication with) the processor 202 (however, it should be appreciated that the computing device 200 could include output devices other than the presentation unit 206, etc.). The presentation unit 206 outputs information (e.g., remedial responses, reward responses, etc.), visually, for example, to a user of the computing device 200 such as the consumer 112; users associated with one or more of the merchant 102, the acquirer 104, the payment network 106, the issuer 108, and/or the fund provider agency 114; etc. It should be further appreciated that various interfaces (e.g., as defined by web-based applications, websites, etc.) (broadly, web-based interfaces) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

In addition, the computing device 200 includes an input device 208 that receives inputs from the user (i.e., user inputs) such as, for example, to redeem a reward, accept a remedial assignment, enter participant information (and/or enroll in a disbursement program), etc. The input device 208 may include a single input device or multiple input devices. The input device 208 is coupled to (and in communication with) the processor 202 and may include, for example, one or more of a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, the system 100 includes the fund provider agency 114 that provides funds to participants of one or more fund disbursement programs (e.g., consumer 112, etc.). The fund disbursement programs may be created and/or executed by numerous different fund providing agencies, including, for example, government or private entities backed, at least in part, by the government; etc. In the exemplary embodiment of FIG. 1, the fund disbursement program disburses funds, via the fund provider agency 114, to participants who live in poverty, live in near poverty, and/or are otherwise unable to fully provide for themselves and/or their families.

It should be understood that the fund provider agency may 114 be any disbursement entity, where funds and/or products are disbursement to one or more participants, where the agency 114 intends and/or desires to affect and/or monitor the behavior, and in particular, purchase behavior, of the participants. Further, it should be understood that, while the fund provider agency 114 may include (or at least partly include) a governmental or government backed entity, such a configuration is not required as the fund provider agency 114 may alternatively include (or at least partly) an entity that is wholly or partially privately controlled and/or managed. Also, it should also be understood that, while a single fund provider agency 114 is illustrated in FIG. 1, other embodiments may include multiple fund provider agencies, which may operate together or independently to provide one or multiple disbursement programs.

The fund provider agency 114 is included to provision funds to participants of a disbursement program, via payment accounts, which may be linked to cards, such as credit cards, prepaid cards, debit cards, or other types of payment devices, such as smartphones, tablets, or fobs. In multiple implementations, the fund provider agency 114 contracts or otherwise agrees with the issuer 108 (or with multiple issuers) for the issuer 108 to provide and/or to manage payment accounts enrolled to the disbursement program provided by the fund provider agency 114. For example, the issuer 108 may designate a range of primary account numbers, or PANs, for use by the fund provider agency 114, and further process and/or manage transactions to those enrolled accounts. The fund provider agency 114 may cause specific transactions to provision funds individually to (e.g., to deposit funds to, etc.) the payment accounts, via the payment network 106, and/or may directly transfer funds to the issuer 108 for provisioning to the payment accounts in response to credit-transactions to the payment accounts. Alternatively, or additionally, in various embodiments, the fund provider agency 114 may act as an issuer for the enrolled payment accounts, such that the fund provider agency 114 is substantially consistent with the issuer 108 as described herein (in whole or in part).

Typically, the fund provider agency 114 provisions funds to the payment accounts of the participants (including the payment account of the consumer 112) at regular and/or irregular intervals, based on one or more of provisioning cycles, work performed by participants, participants' status, eligibility conditions, and/or demographic factors associated with the participants and/or the participants' family, such as age, gender, familial count, disability, location, and/or additional socio-economic factors, etc. In one example, funds may be provisioned by the fund provider agency 114 (in accordance with the corresponding disbursement program) to the payment account of the consumer 112 based on hours worked in a prior week, days worked in a month, projects successfully completed, and/or the type of work being done by the participant. In an additional, or alternatively, example, funds are provisioned, by the fund provider agency 114, more frequently, but in the same amount, when the participant is married with three dependent, as compared to when the participant is single without any dependents.

In addition to provisioning funds to the payment account, the fund provider agency 114 attempts to affect the use of the payment account, and the disbursed funds, for purchase of products consistent with the intent of the fund provider agency 114 and/or the underlying disbursement program. In particular in the system 100, the fund provider agency 114 relies on a behavior engine 116 to evaluate purchase behavior of the participants and to, when/if necessary, attempt to alter the purchase behavior of the participants consistent with the disbursement program, by providing various different responses to the participants (e.g., remedial responses suggesting changes in purchase behavior, reward responses reaffirming purchase behavior, etc.).

The behavior engine 116 of the system 100 is consistent with computing device 200 and is specifically configured, by executable instructions, to perform one or more of the operations herein. The behavior engine 116 may be integrated and/or included, in whole or in part, with the fund provider agency 114, as indicated by the dotted lines in FIG. 1. Alternatively, or in addition, the behavior engine 116, in whole or in part, may be integrated and/or included in the payment network 106, also as shown by the dotted lines in FIG. 1. However, in at least one embodiment, the behavior engine 116 may be a standalone computing device (consistent with computing device 200), coupled to (and in communication with) the fund provider agency 114 and/or the payment network 106. With that said, regardless of configuration, the behavior engine 116 is in communication with the fund provider agency 114 and/or the payment network 106, for example, via network 110, to operate consist with the description herein.

With continued reference to FIG. 1, the system 100 also includes a behavior data structure 118 in communication with the behavior engine 116. The behavior data structure 118 is configured to store a variety of parameters and data, which is used by the behavior engine 116 to determine, for example, a behavior score for a participant (as will be described more hereinafter). For example, the data structure 118 may include a participant profile for each participant of the disbursement program (including for the consumer 112). The participant profile is generally compiled during or after enrollment of the participant in the disbursement program, via the behavior engine 116 and/or one or more web-based interfaces, etc. The participant profile may include, for example, data identifying the participant (e.g., name, government identifier (e.g., social security number, etc.), payment account numbers, etc.) and further details pertaining to the participant that are used by the behavior engine 116, such as contact/location information, payment account details, and information about family, career (e.g., job history, skills, training, etc.), and the like.

The behavior data structure 118 may further include one or more behavior score algorithms, and data related thereto, such as, for example, transaction classification criteria, behavior parameters, weighting parameters, participant work details etc. The algorithms may take a variety of different forms, but are used, by the behavior engine 116, as described herein, to calculate a behavior score for a participant or group of participants to the disbursement program with which the fund provider agency 114 is associated.

The transaction classification criteria included in the behavior data structure 118 may be used, by the behavior engine 116, to classify purchase transactions made by participants using enrolled payment accounts. In particular, the criteria may classify each of the purchase transactions by category of merchant involved in the transaction, by merchant category code (MCC), etc. For example, the criteria may determine that a transaction associated with betting and/or gambling, indicated by MCC 7995, is a negative behavior, while a transaction associated with college tuition, indicated by MCC 8220, is a positive behavior. As such, by use of MCC, or other category associated with a purchase transaction and/or merchant involved in the purchase transaction, the transaction classification criteria can be used to identify purchase transactions, for example, as being for basic necessities, luxuries, education, skill training, transportation, housing and utilities, savings, investment, entertainment, etc. Further transaction classification criteria may then be indicative of the particular products involved in the purchase transactions, apart from, or in combination, with the categories of the merchants involved, etc.

The behavior parameters included in the behavior data structure 118 may be identified, or specified, by the fund disbursement program and/or the fund provider agency 114 based on desires, values, etc. of the program. The behavior parameters may include, without limitation, an amount of spending by participants of the disbursement program, frequency of credits, spending per classification (e.g., per MCC, etc.), spending locations, running balances maintained in payment accounts, demographic details associated with the participants, etc. Additionally and/or alternatively, behavior parameters may include statistical values and/or trends representative of a group and/or population of participants that are associated with the participant (e.g., by location, by demographic, by spending profile, etc.).

The weighting parameters included in the behavior data structure 118 may be specific to the disbursement program, to a participant of the program, to a group of participants, and/or to a condition of the participant (e.g., a participant who has received three remedial responses, etc.), etc. The weighting parameters may be employed to emphasize certain behaviors over other behaviors (whether good or bad) in ultimately determining the behavior score, as described below. Behavior score scale information may then include minimum and maximum values of the behavior score, whether the score scale is relative to the participant population or, alternatively, an absolute calculation, and the like, and may further include thresholds, as described above. The weighting parameters may be arbitrarily selected, for example, by the fund provider agency 114 to help dictate scoring, or they may be based on historical data (e.g., historical transaction data, etc.) as available.

And, the work data included in the behavior data structure 118, for the participants of the disbursement program, may include, without limitation, employer identification, participant role (e.g., job title, work description, etc.), hours worked, total amount worked per interval, average amount worked per interval, whether the participant is full-time or part-time, schedule worked, future scheduled work, attendance records, work history and/or evaluations, etc. The participants' work data may be provided to the data structure 118 (and/or the fund provider agency 114 or the behavior engine 116), in one or more regular or irregular intervals, from employers of the participants (or an associated entity), or it may be retrieved from the employers in one or more manners, by the fund provider agency 114, the behavior engine 116, or otherwise. The work data may further be provided, to the behavior engine 116 and/or data structure 118, by the participant. When the participant provides the work data (e.g., by entering the data to an interface, or by providing documentation, etc.), the work data may be verified and/or audited in one or more ways.

In addition, the behavior data structure 118 includes one or more thresholds to distinguish the participants' behavior, based on their resulting scores, between positive, negative and/or neutral behavior. The thresholds are often derived from historical data and/or the particular algorithm(s) employed to determine the behavior score, and/or may further be defined by the disbursement program and/or the fund provider agency 114. In certain embodiments, the thresholds are selected to affect a certain number of scores and/or to affect a certain portion of the population of participants enrolled in the disbursement program. For example, one threshold may be selected such that participants with the lowest 10% of behavior scores are below the threshold, while another threshold may be set such that participants with the highest 10% of behavior scores are above the threshold. It should be appreciated, however, that other percentages, number and/or other measures of participants, relative to other participants (or independent of other participants) may be employed in other embodiments.

Further, the behavior data structure 118 includes one or multiple responses, and specifically, reward response and remedial responses, to be provided to the participants, based on the behavior scores (and their relation to the thresholds). Reward responses may include messages, discounts toward future purchase(s) (e.g., coupons, offers, rebates, etc.), prizes, training, education, and/or any other responses, which might be understood and/or received as an indication and/or recognition of positive purchase behavior, etc. Remedial responses may include messages, such as warning messages and/or directions to complete conditions for continued participation in the disbursement program, and/or any other response, which might be understood and/or received as an indication and/or recognition of negative purchase behavior, etc. In connection with remedial responses, conditions may include completion of training and/or education, community service, and/or the avoidance of certain purchase categories (e.g., betting (MCC 7995), drinking places (MCC 5813), etc.).

Notwithstanding the specific examples above, it should be appreciated that various different forms of data, algorithms, thresholds, responses, etc. may be stored in the behavior data structure 118, and utilized, as described herein, to score and attempt to alter/encourage behavior of the participants of the disbursement program.

In the illustrated embodiment, the behavior data structure 118 is illustrated as separate from the behavior engine 116. In various other embodiments, however, the behavior data structure 118 may be integrated with the behavior engine 116. Regardless, the behavior engine 116 is in communication with the data structure 118 to access, store and/or update data therein. In one or more embodiments, the behavior data structure 118 may further be in communication with, for example, the payment network 106 to receive and store transaction data, directly, and/or to other entities providing data to be stored therein (e.g., an employer providing work details, etc.)

With further reference to FIG. 1, the behavior data structure 118 is populated by the fund provider agency 114 based on the disbursement program with which the data structure 118 is associated. In connection therewith, certain web-based interfaces (e.g., via web-based applications, websites, etc.) may be displayed to users, at presentation unit 206, to solicit the various information stored in the data structure 118. In addition, for participant specific information, registration of the participant, by one or more users, via one or more web-based interfaces, may cause the participant specific information (e.g., a participant profile) to be generated and/or stored in the data structure 118. Apart from participants, the disbursement program (and other disbursement programs) may be registered to the fund provider agency 114 and/or the behavior engine 116, by users, via the same or different interfaces, whereby associated behavior parameters, etc., may be stored in the behavior data structure 118 and/or identified to the disbursement program. Such users may include, for example, employees, managers, case works, etc., associated with the fund provider agency 114. In at least one embodiment, the participant (e.g., consumer 112, etc.) may be a user, which contributes to his/her registration (via one or more web-based interfaces, etc.). In some embodiments, participants are enrolled in the disbursement program, by the fund provider agency 114, based on an ID card or other ID device issued by a government entity and data stored by the fund provider agency 114 or a different government agency. Participants may receive a fund disbursement card or other device at the time of enrollment, or the fund payment account may be associated with the ID card or device issued by the government entity. The fund provider agency 114, in turn, provides participant data to the behavior engine 116 (and the data structure 118 for storing therein) in order to cause the operations as described.

In the exemplary embodiment, the behavior engine 116 is specifically configured to access transaction data representative of transactions to the payment account of the consumer 112, i.e., an enrolled payment account funded by the fund provider agency 114. The behavior engine 116 is also configured to classify the transactions (based on the classification criteria), and to further calculate a behavior score for the consumer 112. As described, the score is calculated based on, for example, the participant's profile, the classifications of purchases, the behavior parameters, and/or the participant's work details, etc. The behavior engine 116 is configured to then compare the calculated behavior score to one of more of the thresholds and, based on the comparison, determined if one or more responses should be provided to the consumer 112. The behavior engine 116 is configured to flag the consumer 112, thereby identifying the consumer 112 to the fund provider agency 114, and/or to cause the response to the provided to the consumer 112, as necessary, whether directly or through one or more additional entities, etc.

Figure 3:
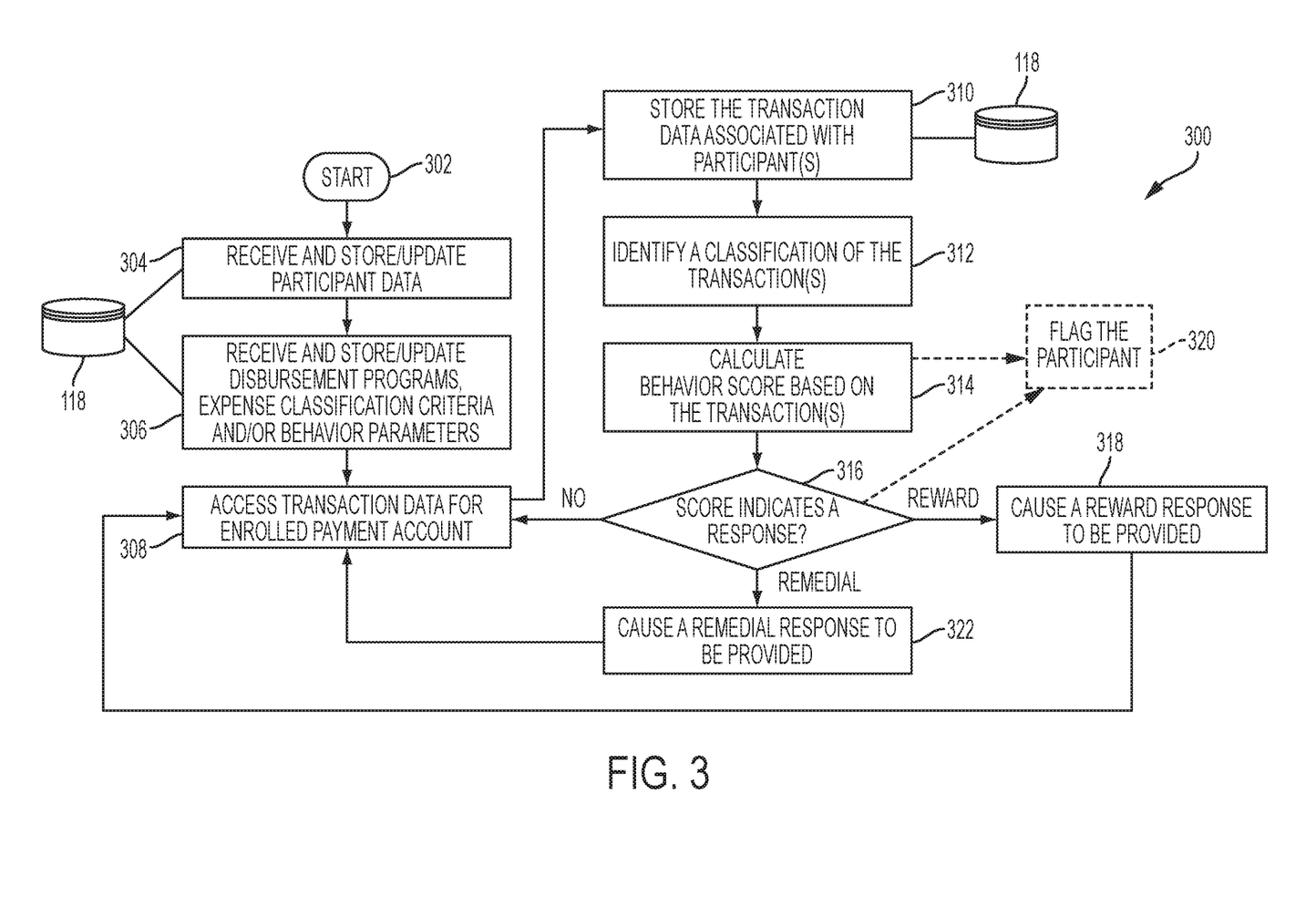
FIG. 3 is an exemplary method, which may be implemented in connection with the system of FIG. 1, for determining purchase behavior scores for participants of disbursement programs and providing responses to the participants based on the purchase behavior scores.

FIG. 3 illustrates an exemplary method 300 for responding to purchase behaviors of a participant of a fund disbursement program. The exemplary method 300 is described as implemented in the behavior engine 116, in connection with interactions between the consumer 112 (as a participant in a fund disbursement program), the merchant 102, the payment network 106, and the fund provider agency 114 of the system 100, and further with reference to computing device 200. However, it should be understood that the method 300 is not limited to this configuration, as the method 300 may be implemented in other parts (or combinations of parts) of the system 100, or in multiple other computing devices. As such, the methods herein should not be understood to be limited to the exemplary system 100 or the exemplary computing device 200, and likewise, the systems and the computing devices herein should not be understood to be limited to the exemplary method 300.

As shown in FIG. 3, the method 300 is initiated, at 302, when the fund provider agency 114 registers a disbursement program to be monitored by the behavior engine 116. In particular, the fund provider agency 114 provides the specifics of the disbursement program, including the classification criteria, behavior parameters, thresholds, and other data etc., which permit the behavior engine 116 to operate as described herein.

In addition, at 304, the fund provider agency 114 registers a participant to the behavior engine 116, for example, by providing a participant profile for the participant (e.g., the consumer 112, etc.). As described above, the participant profile may include a variety of information, but at least includes a payment account number or other information sufficient to identify an enrolled payment account for the participant. As part of registering the disbursement program and/or the participant, the fund provider agency 114 provides various conditions, such as, for example, a frequency at which the participant is monitored (e.g., one per month, one per week, etc.), etc. It should be appreciated that the method 300 of FIG. 3 illustrates the registration of the disbursement program prior to the registration of the participant. However, such registration may occur in a different order in other embodiments.

Also in the method 300, data received in registering the disbursement program and/or the participant is stored in the data structure 118 (e.g., memory 204, etc.), at 306, and accessed, by the behavior engine 116, as needed herein.

Once registration is complete (or substantially complete), the behavior engine 116 begins monitoring the participant. In particular, the behavior engine 116 accesses transaction data for the participant and/or the enrolled payment account, at 308. The behavior engine 116 may access the transaction data by, for example, monitoring authorization, settlement, and/or clearing messages to/from/through the payment network 106, or retrieving and/or receiving a file containing transaction data to the enrolled payment account from the payment network 106, or parts thereof. In one or more embodiments, the behavior engine 116 may access the transaction data at different times and/or points in the transaction cycle depending on, for example, whether or not the behavior scoring is intended to be time specific (e.g., real-time, daily, weekly, monthly, etc.) as indicated by the fund provider agency 114, etc.

After accessing the transaction data, the behavior engine 116 stores the transaction data in the data structure 118, at 310. For each transaction (or product) to the enrolled payment account included in the accessed transaction data, the behavior engine identifies, at 312, a classification of the transaction (or product), based on the classification criteria stored in the data structure 118. Such classifications may include, for example, basic necessities, luxuries, education expenses, skills training expenses, transportation expenses, housing and utilities, savings, investment, entertainment, merchant-based classifications, etc. The classification criteria may be defined to determine a classification based on the merchant associated with the transaction, the method of purchase, and/or the products and/or services purchased. In one example, the classification criteria identifies all MCCs as being positive, negative or neutral, whereby the transactions are classified in one of the three classes for use below (based on the MCC involved in the transaction). In other examples, different classifications, or further sub-classifications, may be employed to provide a more specific or less specific classification of transactions for use below.

After classifying the transactions, the behavior engine 116 calculates (broadly, determines) a behavior score for the participant, at 314. The behavior score is calculated, through one or more algorithms, which are based on at least some of the classified transactions and one or more behavior parameters (stored in the data structure 118). One exemplary algorithm for calculating the behavior score, by the behavior engine 116, is as follows:

$$\text{Behavior Score} = (F_1 \times W_1) + (F_2 \times W_2) + (F_3 \times W_3) + (F_4 \times W_4) + (F_5 \times W_5) \quad (1)$$

where F is a factor, i.e., a behavior parameter, and W is the weight applied to each factor. It should be appreciated that while the algorithm (1) includes five factors (each associated with a weight), a different number of factors (and weights) may be used in other algorithms, which may be weighted or not weighted.

In various embodiments, the behavior engine 116 calculates the participant's behavior score for a defined interval (e.g., based on transactions made in the defined interval, etc.), such as the last week, the last month, the last three months, the last six months, or the last year, or another suitable interval. Further, the behavior score may be calculated in a running manner (e.g., updated for each transaction or group of transactions, etc.), or at a defined time (e.g., Monday at 3:00pm, etc.), or during the defined interval (e.g., each day, every Monday, 1st of the month, etc.).

The weights applied to the factors in the algorithm (1) are used to provide different levels of influence with respect to the behavior score. For example, the calculation to determine the behavior score may be based on two behavior parameters (e.g., factors $F_1$ and $F_2$; etc.): a percentage of funds spent on basic necessities per month and a percentage of work days worked over the month. Calculating the score may include multiplying the percentage of funds spent on basic necessities by a weight factor (e.g., weight $W_1$, etc.) of three and multiplying the percentage of work days worked by a weight factor of one (e.g., weight $W_2$, etc.) (indicating that funds spent on basic necessities carries an importance of three times the percentage of work days worked). The two resulting weighted behavior parameter values may then be summed to obtain a participant behavior score. As should be appreciated, because the weight factor of the first parameter is three and the weight factor of the second parameter is one, the first parameter has a larger influence on the final behavior score. It should be understood that weight factors may be defined as simple numbers, or may represent percentages of the whole final behavior score.

Turning to a specific example, the behavior engine 116 may rely on four behavior parameters (e.g., factors $F_1$, $F_2$, $F_3$, and $F_4$; etc.), in the algorithm (1), to calculate a weekly behavior score, for the participant: frequency of credits to the participant's account (payment for working) ($F_1$), daily running balance of participant's account ($F_2$), spent amount on basic necessities ($F_3$), and an amount spent on skills/training ($F_4$). The behavior engine 116 further employs weights (e.g., $W_1$, $W_2$, $W_3$, and $W_4$; etc.), per behavior parameter, as provided in Table 1.

TABLE 1

| Parameter (F) | Weights (W) |
|---|---|
| Frequency of credits to account | 10 |
| Daily running balance on account | 30 (scale: $1-$100) |
| Amount spent on basic necessities | 20 (scale: $1-$100) |
| Amount spent on skill/training | 40 (scale: $1-$100) |

The behavior engine 116 uses the scales associated with the selected weights, as shown in Table 1, to provide the weight based on the un-weighted value of the parameter being within the specific range. If the value of the parameter is outside of the range (or scale), for example, the weighted parameter value is the maximum or minimum value (e.g., if the daily running balance is less than $1, the weighted parameter value is 0 and if the daily running balance is more than $100, the weighted parameter value is 30).

In this specific example, the participant has a frequency of credits of 1 (i.e., the participant was paid every work day for the week), and the weighted parameter value is 10 (i.e., 10*1). Also, the participant has an average daily running balance in his/her payment account of $90, from which the behavior engine 116 determines a weighted parameter value to be 27 (i.e., ($90/$100)*30). The participant has spent $60 on basic necessities and $200 on a training class, from which the behavior engine 116 determines weighted parameters values of 12 (i.e., ($60/$100)*20) and 40 (i.e., ($100(max)/$100)*40), respectively. In view of the above, in this specific example, the behavior engine 116 calculates, by then summing the weight parameters values, the behavior score to be 89.

With reference again to FIG. 3, once a participant behavior score is calculated, the behavior engine 116 determines, at 316, whether a response is necessary, and if so, what kind of response. As described above, the behavior engine 116 may employ one or more different thresholds that, when satisfied (or not) by a behavior score, indicate that either a remedial response or a reward response (or no response) should be provided to the participant. A reward response, for example, may simply include a positive message, or may include discounts toward future purchases, products, additional training, increased benefits, prizes, and/or other objects of value. Example prizes may be classified as luxury items, such as electronics or media (e.g., movies, video games, music, etc.). And, discounts may be toward defined classifications of expenses, such as necessities like groceries, clothing, or fuel. Conversely, a remedial response may include, for example, financial training (e.g., budget training, etc.), jobs training, skills training, and/or other education to aid the participant and improve future behavior, and/or conditions for continued participation in the disbursement program. The condition may include, for example, perfect work attendance, community services, random testing of the participant, etc. Further, the remedial response may include a warning about further bad behavior, whereby the participant's continued participation in the disbursement program may be ended or terminated.

If a reward response is indicated by the behavior score, the behavior engine 116 causes, at 318, a reward response to be provided to the participant. Alternatively, if a remedial response is indicated, the behavior engine 116 identifies the participant and causes, at 320, a remedial response to be provided to the participant. In the above example, the behavior engine 116 considers two thresholds. A remedial threshold is set at score level 50 or below and a reward threshold is set at score level 80 or above. A score below 50 indicates that the participant is not succeeding at an expected level and a remedial response should be provided to the participant. A score above 80 indicates that the participant is exceeding expectations and rewards should be provided to further incentivize the participant and others to continue succeeding. And, a score between 50 and 80 results in no response (e.g., the behavior engine 116 returns to operation 308 to await further transactions to enrolled account and/or a next interval to calculate a subsequent behavior score for the participant, etc.). For the calculated score of 89, the behavior engine 116 determines the reward threshold is satisfied, and thus causes the reward response to be provided, at 318. It should be understood that any different thresholds and/or number of thresholds may be employed in numerous embodiments to indicate a response is to be provided.

In at least one embodiment, the behavior engine 116 optionally (as indicated by the dotted lines in FIG. 3) flags the participant, at 320, when the behavior score satisfies one or more thresholds. In doing so, the participant is identified to the fund provider agency 114 associated with the disbursement program as exhibiting behavior that is suitable for remediation and/or reward, as appropriate in view of the one or more thresholds. In such an example, the fund provider agency 114 may be informed of the behavior of the participant, without necessarily sending a response to the participant. In a further alteration of the example, the fund provider agency 114 may transmit or otherwise provide the response to the participant, when (or after) the participated is flagged by the behavior engine 116, such that again, the behavior engine 116 has caused (by flagging the participant) the response to be provided, etc. Conversely, in addition to flagging the participant, the behavior engine 116 may still cause the response to be provided to the participant, without the participation from, or with only limited participation from, the fund provider agency 114.

Additionally, or alternatively, the behavior engine 116 may cause the response to be provided, for example, to the participant, or by directing the fund provider agency 114 to provide the response to the participant, at 322. The response may be provided, for example, electronically to a computing device associated with the participant (e.g., consumer 112, etc.) (e.g., via email, short message service (SMS), phone call, fax, etc.), or physically to a residence or other location associated with the participant. It should be appreciated that the form and/or kind of response may indicate how the response is to be provided. In at least one embodiment, the behavior engine 116 causes a third-party, i.e., an entity other than the fund provider agency 114, to provide the response to the participant.

Then in the method 300, the behavior engine 116 returns to operation 308 to await further transactions to enrolled account and/or a next interval to calculate a subsequent behavior score for the participant, etc.

Further illustrative examples of the above method 300 are described next.

In one example, the behavior score is calculated, at 314, by the behavior engine 116, based on five factors: frequency of credit reload ($F_1$), running balance ($F_2$), spent categories ($F_3$), location spend ($F_4$), and card standing in population of similar cards ($F_5$), each of which is weighted (consistent with the algorithm (1)). Specifically, the "frequency of credit reload on prepaid card" is weighted at 20% ($W_1$), and "running balance on prepaid card", with a $10-$29.99 range weighted at 30% and a $30-$50 range weighted at 30% ($W_2$). Further, "spending categories" is weighted at 10% for food (for a scale of $1-$100) and/or basic necessities and weighted at 20% for skills enhancement and/or education (for a scale of $1-$100) ($W_3$). The "location improvement spending" is weighted at 10% ($W_4$), and the "card standing within the population" is weighted at 10% ($W_5$).

For the above example, the behavior engine 116 utilizes the following thresholds. In particular, the behavior engine 116 determines, based on a score of 80-100 that the participant is exceeding (e.g., suited for a reward response), a score of 50-80 that the participant meets expectation (e.g., suited for no responses, potentially), or a score below 50 that the participant requires review (e.g., suited for a remedial response, etc.).

Furthermore, in this example, the participant is associated with the following statistics for the past week: the participant's payment card is credited $100 for each of the last seven days due to the participant's participation in a work program ($F_1=1$, representing that the participant was paid every work day); the participant's daily running balance for his/her payment account is $50 ($F_2$); the participant spent $40 ($F_3$) on food (e.g., MCC 5812, etc.) and $100 ($F_3$) on computer training (e.g., MCC 8220, etc.); the participant did not improve location (or spend to improve location) ($F_4$); and the average payment card balance for similar cards across the nearby population is $20 ($F_5$) (since the participants running balance is greater than $20, the participant will receive the maximum weighted value of 10 for this factor).

In view of the above, the behavior engine 116 calculates the behavior score, using algorithm (1), for the participant as follows, taking into account each of the above factors:

$$\text{Score} = (1*20) + \left(\left(\frac{50}{50}\right)*30\right) + \left(\left(\frac{40}{100}\right)*10 + \left(\frac{100}{100}\right)*20\right) + (0) + \left(\frac{20}{20}\right)*10 = 84$$

Based on the participant's behavior score of 84, the behavior engine 116 determines, at 316, that the behavior score exceeds expectation, as per the above program thresholds, and in turn, causes a reward response to be provided to the participant, at 318. The reward response may include providing the participant with a discount on future food purchases, a pre-loaded card for purchasing items such as fuel, or the like. Other reward responses are described above.

In another example, the behavior engine 116 calculates, at 314, the behavior scores of two different participants (participants A and B) in a disbursement program, relative to average participant values. In so doing, the behavior engine 116 relies on four factors: wages (including number of hours worked, continuous wage work days, and running credit balance) ($F_1$) weighted 30% ($W_1$); amount spent on basic necessities (such as housing, food, and healthcare) ($F_2$) weighted 40% ($W_2$); skill enhancement expenses (including education for the participant and for the participant's children) ($F_2$) weighted 20% ($W_3$); and the participant's behavior relative to a similar population ($F_4$) weighted 10% ($W_4$).

Furthermore, in this example, participant A worked 64 hours in the last week; worked for 20 continuous days; averages a weekly credit balance of $100; spends $90 of food weekly; and spends $100 on skill enhancement. Participant A also receives an increased wage due to learning new skills which amounts to $20 weekly. Conversely, participant B worked 40 hours in the last week; worked for five continuous days; averages a weekly credit balance of $50; spends $100 on food weekly; and spends $0 on skill enhancement, but does not receive an increase in wages. For this example, the behavior engine 116 further relies on the following: the average behavior performance of the population in which the participants A and B live is 60 hours worked per week; 15 days continuous work; $80 average weekly credit balance; $100 spent on food/basic necessities weekly; and $40 average spent on value add/skill enhancement weekly. Table 2 summaries the above data.

TABLE 2

|  | Participant A | Participant B | Average |
|---|---|---|---|
| Hours worked | 64 | 40 | 60 |
| Continuous days worked | 20 | 5 | 15 |
| Average weekly credit balance | $100 | $ 50 | $ 80 |
| Basic necessities spending | $ 90 | $100 | $100 |
| Skill enhancement | $100 | $ 0 | $ 40 |

In this example, based on the above data, the behavior engine 116 determines a behavior score, relative to the average, for participant A, as follows:

Score=30%((64−60)+(20−15)+(100−80))+40%(100−90)+20%(100−40)+10%(100)

Score=8.7+4+12+10=34.7

Specifically, the wage factor for participant A may be calculated by comparing hours worked (64-60=4), continuous days worked (20-15=5), and average weekly credit balance (100-80=20) with the average scores. The sum of values is then multiplied by the weight of 30%, i.e., (4+5+20)*.3=8.7. Participant A spent $10 less than average on basic necessities, so the second factor may be calculated by multiplying the weight of the second factor of 40% by 10, i.e., 10*.4=4. Participant A spent $60 more on skill enhancement than average, resulting in a third factor of 60*.2=12. Because participant A is better than average on all three of the first three factors, the fourth factor is a full 10. The behavior score added together is thus 34.7 for participant A.

Additionally, in this example, based on the above data, the behavior engine 116 determines a behavior score, relative to the average, for participant B, as follows:

Score=30% ((40−60)+0+(50−80))+40%(100−100)+20%(0)+10%(0)

Score=−15+0+0+0=−15

Similarly, the wage factor for participant B may be calculated by comparing the sub factors against the average scores: hours worked (40-60 =−20), continuous days worked (5-15=−10), and average weekly credit balance (50-80 =−30). It should be understood that, in this example, a participant does not receive a negative value for failing to match the continuous days worked of the average. Rather, the value is treated as a zero. Hence, the continuous days worked factor for participant B is a zero. The sum of the sub-factors is summed and multiplied by the weight of 30%, i.e., ((−20+0+−30)*.3)=−15. The second factor results in 0, as participant B spends the same amount as the average on basic necessities. The third factor is calculated by comparing skill enhancement for participant B to the average score and, once again, the participant does not receive a negative value for failing to match the skill enhancement spending average. Hence, the third factor is zero. The fourth factor is 0 because the participant B does not exceed the average on any of the previous factors. All told, the behavior engine 116 determines, at 314, a behavior score of −15 for participant B.

In this example, sufficiently positive scores, such as the score of participant A, may be identified by the behavior engine 116, based on a disbursement program threshold, for example, to merit receiving a reward response, at 316, while negative scores, such as the score of participant B, may again, based on the same or a different disbursement program threshold, result in the behavior engine 116 causing a remedial response to be provided, at 320. For instance, participant A may receive a pre-paid mobile phone as a reward, while participant B may be recommended to attend a job skills or budgeting class as a remedial action. Alternative rewards and remedial response, which may be caused to be provided, are described above.

While the exemplary method 300 is described in the various examples herein with reference to a score per participant, the behavior engine 116 may instead determine behavior scores for a group of participants. The fund provider agency 114 may use such scores to determine success of the overall disbursement program over time. Statistics provided by the behavior engine 116 may be used to determine whether and to what degree the participant's behavior improved (individually, or as a group), as a result of both remedial and reward responses. Further, the fund provider agency 114 may use the behavior engine 116 to monitor consistency of participants with positive and/or negative behavior patterns. Participant location data may also be used in combination with behavior statistics to monitor movements of participants between different locations, determine potential behavioral effects on participants based on location, draw conclusions about the locations participants tend to move to or move away from, etc. Through statistical analysis of program participants, alone or as a group over time, the fund provider agency 114 may determine types of remedial actions and/or rewards that are most effective at improving behavior patterns of participants.

In view of the above, the systems and methods herein may enable a fund provider agency, through the use of a behavior engine, to gather behavior data associated with participants in a fund disbursement program. The fund provider agency may then make use of behavior data (e.g., behavior scores, etc.) to provide aid and/or incentives to certain participants, while providing remedial efforts to other participants, as appropriate in order to improve participant behaviors. Further, by applying the behavior data analysis to groups of participants, the fund provider agency may discover behavior patterns and/or trends that may be used to determine effective incentives and/or remedial actions for future applications.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by: (a) accessing transaction data associated with an enrolled payment account, the enrolled payment account associated with a participant and a disbursement program, the transaction data representative of a number of transactions, (b) identifying for each of the transactions, a classification based on at least one classification criteria, (c) calculating a behavior score based on at least one behavior parameter and the classification of at least one of the transactions; and (d) when the behavior score satisfies a remedial threshold, causing a remedial response to be provided to the participant, whereby the remedial response provides an indication to the participant to alter his/her purchase behavior.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use by a computing device to monitor payment network transactions for payment accounts enrolled in a disbursement program, the method comprising:

storing, by a computing device, registration data for a disbursement program in a behavior data structure, the behavior data structure including a plurality of transaction classification criteria, and wherein the registration data is associated with a plurality of participants in the disbursement program and includes, for each of the plurality of participants, a participant profile including an identifier indicative of a payment account associated with the participant and enrolled in the disbursement program;

for each of the plurality of participants in the disbursement program:

accessing, by the computing device, transaction data for a plurality of payment network transactions involving the payment account associated with the identifier included in the participant profile for said participant, the transaction data including, for each of the plurality of payment network transactions, an amount of the payment network transaction and a merchant category code (MCC) for a merchant involved in the payment network transaction;

storing, by the computing device, the transaction data in the behavior data structure;

accessing, by the computing device, work data for said participant and storing, by the computing device, the work data in the behavior data structure;

identifying, by the computing device, for each of the plurality of payment network transactions, a classification for the payment network transaction based on at least one of the plurality of transaction classification criteria and the MCC included in the transaction data for the payment network transaction;
calculating, by the computing device, a behavior score for said participant based on a plurality of different behavior parameters and the classification of at least some of the payment network transactions, each of the plurality of behavior parameters based on at least one of: an amount of funding spent on basic necessities, an amount of funding spent on training, an amount of funding spent on luxuries, a frequency of deposits to the payment account associated with the at least one participant, a number of consecutive work days, and/or an average daily balance in the payment account associated with the said participant, wherein at least one of the plurality of different behavior parameters is weighted; and
comparing, by the computing device, the behavior score to at least one of a plurality of thresholds, the plurality of thresholds including at least a remedial threshold and a reward threshold; and
when the behavior score for at least one participant of the plurality of participants satisfies the remedial threshold, causing, by the computing device, a remedial response to be provided to the at least one participant via a network, whereby the remedial response provides an indication to the at least one participant to alter purchase behavior of the at least one participant.

2. The computer-implemented method of claim 1, further comprising causing, by the computing device, a reward response to be provided to the at least one participant when the behavior score satisfies the reward threshold, whereby the at least one participant is informed that the at least one participant's purchase behavior is to be continued.

3. The computer-implemented method of claim 2, wherein the reward response includes a discount toward a future purchase made with the payment account associated with the at least one participant; and
wherein the remedial response includes at least one condition that must be satisfied by the at least one participant in order to continue participating in the disbursement program.

4. The computer-implemented method of claim 1, wherein the plurality of different behavior parameters include at least three behavior parameters; and
wherein calculating the behavior score includes:
weighting, based on the transaction data, a value for said participant associated with each of the at least three behavior parameters; and
combining the weight values for each of the at least three behavior parameters.

5. The computer-implemented method of claim 1, wherein accessing the work data for said participant includes accessing the work data for a defined interval; and
wherein calculating the behavior score includes calculating the behavior score further based on the work data for said participant.

6. The computer-implemented method of claim 1, wherein the classification of at least one of the plurality of payment network transactions is identified to multiple ones of the plurality of payment network transactions; and
wherein calculating the behavior score includes calculating the behavior score based on a total amount of said multiple of the plurality of payment network transactions.

7. The computer-implemented method of claim 1, wherein calculating the behavior score includes calculating the behavior score for a defined interval; and
wherein the defined interval is selected from one of a week, multiple weeks, a part of a month, and a month.

8. The computer-implemented method of claim 1, wherein causing the remedial response to be provided to the at least one participant via the network includes transmitting, via the network, the remedial response to the at least one participant.

9. A system for monitoring payment network transactions for payment accounts enrolled in a disbursement program, the system comprising:
a behavior data structure, the behavior data structure including (a) a plurality of profiles for participants in a disbursement program, each profile including an identifier indicative of a payment account associated with the participant and the disbursement program, and (b) a plurality of transaction classification criteria;
a computing device in communication with the behavior data structure and a payment network, the computing device configured to, for each of the participants:
access transaction data for a plurality of payment network transactions involving the payment account associated with said participant and the disbursement program;
identify, for each of the plurality of payment network transactions, a classification for the payment network transaction based on (a) at least one of the plurality of transaction classification criteria and (b) at least one merchant category code (MCC) included in the accessed transaction data;
calculate a behavior score for said participant based on the accessed transaction data and at least a first behavior parameter and a second behavior parameter, wherein the first behavior parameter includes a total amount of payment network transactions for the payment account associated with said participant within at least one of the identified classifications, and wherein the second behavior parameter includes a running balance of payment network transactions for the payment account associated with said participant, wherein the computing device is configured to, in connection with calculating the behavior score:
determine the total amount of transactions in the transaction data associated with said classification;
weight the total amount of the transactions by a first weight associated with the first behavior parameter;
determine the running balance of transactions for the payment account based on the transaction data over a defined interval;
weight the running balance by a second weight associated with the second behavior parameter; and
sum at least the first weighted total amount and the second weighted running balance;
compare the behavior score to at least one of a plurality of thresholds, the plurality of thresholds including at least a remedial threshold and a reward threshold, wherein the remedial threshold is based on a percentage of participants in the disbursement program and the reward threshold is based on a percentage of participants in the disbursement program;
when the behavior score for said participant satisfies the remedial threshold, transmit a remedial response to said participant via a network, through which said participant is informed to alter one or more purchase behaviors; and when the behavior score for said participant satisfies the reward threshold, transmit a reward response to said participant via the network, through which said participant is informed that a purchase behavior of said participant is to be continued;

whereby the purchase behaviors of the participants in the disbursement program are able to be influenced consistent with an intent of the disbursement program.

10. The system of claim 9, wherein the computing device is configured to calculate the behavior score for each of the participants relative to transaction data for other participants in the disbursement program.

11. The system of claim 10, wherein the computing device is further configured, in order to access the transaction data, to retrieve the transaction data from the payment network at least once within a defined interval.

12. A non-transitory computer readable storage media including executable instructions for monitoring payment network transactions for payment accounts enrolled in a disbursement program, which, when executed by at least one processor, cause the at least one processor to:
- access transaction data for a plurality of payment network transactions to a payment account associated with a disbursement program and a participant in the disbursement program;
- determine that a first payment network transaction from the multiple payment network transactions is associated with a first category based on the merchant category code (MCC) in the accessed transaction data for the first payment network transaction;
- based on the determination that the first payment network transaction is associated with the first category, identify the first payment network transaction from the multiple payment network transactions to a first classification;
- determine that a second payment network transaction from the multiple payment network transactions is associated with a second category based on the MCC in the accessed transaction data for the second payment network transaction;
- based on the determination that the second payment network transaction is associated with the second category, identify the payment network transaction from the multiple payment network transactions to a second classification;
- calculate a behavior score, for the participant, based on the transactions in the first classification and the second classification;
- determine whether the behavior score satisfies at least one threshold; and
- flag the participant to a fund provider agency associated with the disbursement program when the behavior score satisfies the at least one threshold, such that the participant is identified to the fund provider agency as exhibiting behavior that requires remediation and/or is suitable for reward, whereby the behavior of the participant in connection with initiating payment network transactions to the payment account is able to be influenced by the fund provider agency consistent with an intent of the fund provider agency and/or the disbursement program.

13. The non-transitory computer readable storage media of claim 12, wherein the executable instructions, when executed by the at least one processor, cause the at least one processor, in order to calculate the behavior score, to calculate the behavior score based on a weighted value for the first transaction identified to the first classification and a weighted value for the second transaction identified to the second classification; and
wherein the executable instructions, when executed by the at least one processor, further cause the at least one processor to cause either:
- a remedial response to be provided to the participant when the behavior score satisfies the at least one of the at least one threshold; or
- a reward response to be provided to the participant when the behavior score satisfies the at least one of the at least one threshold.

14. The non-transitory computer readable storage media of claim 13, wherein the executable instructions, when executed by the at least one processor, cause the at least one processor to calculate the behavior score further based on at least one of a frequency of transactions to the payment account and a running balance of transactions to the payment account.

15. The non-transitory computer readable storage media of claim 13, wherein the first classification is defined by at least one merchant category code (MCC), and wherein the second classification is defined by a location of the merchant involved in said transaction.

16. The non-transitory computer readable storage media of claim 15, wherein the at least one threshold includes a remedial threshold and a reward threshold; and
wherein the remedial threshold and the reward threshold include a same value, such that the behavior score satisfies the remedial threshold when it is below said same value and satisfies the reward threshold when it is above said same value.

* * * * *